Dec. 26, 1944. H. P. PHILLIPS 2,365,725
REGROOVE PISTON RING ASSEMBLY AND METHOD
Filed April 23, 1942
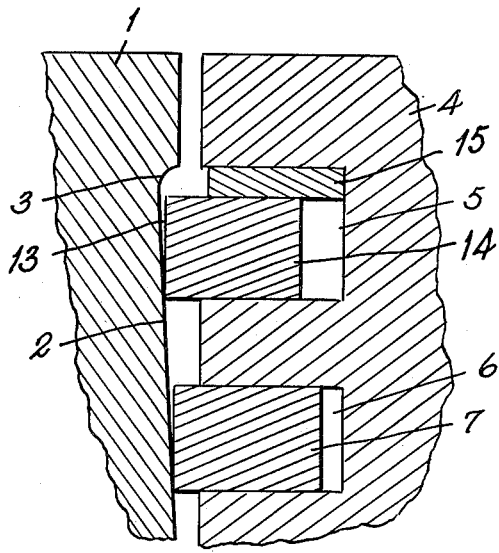
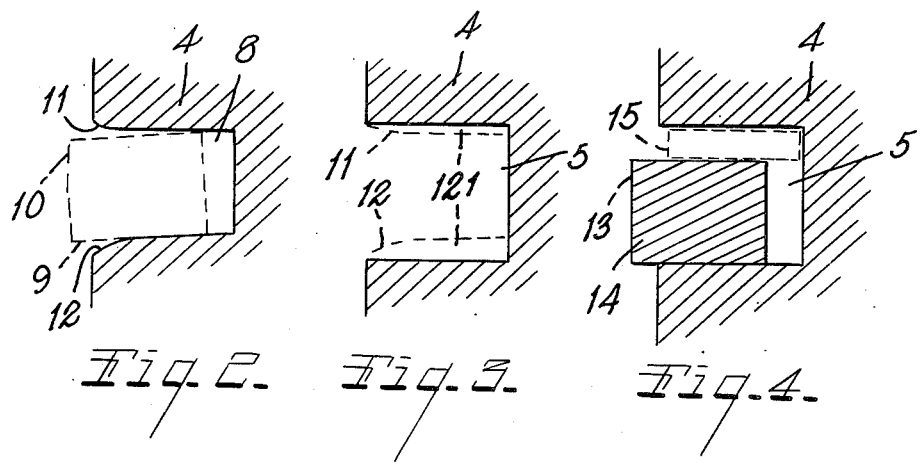
INVENTOR.
Harold P. Phillips
BY Earl J. Chappell Patented Dec. 26, 1944

2,365,725

UNITED STATES PATENT OFFICE 2,365,725

REGROOVE PISTON RING ASSEMBLY AND METHOD

Harold P. Phillips, Hastings, Mich., assignor to Hastings Manufacturing Company, Hastings, Mich., a corporation of Michigan Application April 23, 1942, Serial No. 440,237

4 Claims. (Cl. 29—156.5)

This application is a continuation in part of my copending application Serial No. 308,521, filed December 11, 1939.

The main objects of the present invention are:

First, to provide an improved method for correcting worn piston ring grooves, including steps of regrooving or enlarging the same and installing a replacement compression ring assembly of novel character, whereby standard parts may in the main be employed, and improved efficiency of operation obtained, as well as eliminating the need for ridge reaming the cylinder, as in usual replacement practice.

Second, to provide a regroove piston ring assembly for use in an enlarged, regrooved compression ring groove, to eliminate the need for stocking and employing the usual oversize replacement rings, in turn eliminating the disadvantages to which said oversize replacement rings are subject.

Third, to provide a replacement piston ring assembly for regrooved pistons, including a spacer element enabling a standard size compression member to be employed, which element is fabricated of a material well adapted to withstand severe thermal conditions to which it is subjected.

Fourth, to provide a piston ring replacement assembly for use in the conditions indicated above, in which desired high unit cylinder wall pressure is obtained, such as could not be accomplished with an oversize replacement ring, and at the same time eliminating the likelihood of striking the annular ridge or shoulder commonly found on worn cylinders, so that the latter need not be removed by a ridge reaming operation as a condition precedent to use of the replacement assembly.

Objects relating to details and economies of the invention will appear from the description to follow. The invention is defined in the claims.

A preferred embodiment of the invention is illustrated in the accompanying drawing, in which:

Fig. 1 is an enlarged fragmentary view in vertical section, illustrating the improved replacement assembly installed in the enlarged or regrooved compression ring groove of a piston in operative relation to a worn cylinder wall, no attempt having been made to preserve the exact clearance and tolerance ordinarily provided in such installations, nor to show the parts in their relative fit or in exact relative proportions.

Figs. 2, 3 and 4 are fragmentary views illustrating progressively a worn piston compression ring groove, the regrooving thereof, and the installation of a replacement compression ring assembly therein, in accordance with my invention, certain of the elements and material removed from the groove being indicated in dotted lines.

The present invention relates to a replacement piston ring assembly adapted to be installed particularly in the worn compression ring groove of a piston after the same has been enlarged or regrooved to remove worn portions thereof and retrue the walls of the groove; likewise to a particular method for effecting the regrooving and installing operation so that when completed the compression ring assembly provides a higher unit cylinder wall pressure than is ordinarily possible in presently common methods utilizing oversize replacement rings.

Due to the fact that the replacement compression ring is of standard size, rather than oversize, I obviate the necessity of manufacturing and stocking the latter, for which there is relatively little call, in large quantities. Likewise it is common knowledge that, in addition to the fact that the walls of the top compression ring groove of the piston are subject to much greater wear than the other piston ring grooves, the wear on the cylinder produced by the compression ring results in the formation of an annular ridge or shoulder at the top of the compression ring stroke. Accordingly, in regrooving the compression ring groove and installing an oversize compression ring in accordance with conventional practice, it becomes necessary to ream out this shoulder in order to avoid its being struck by the enlarged replacement ring filling the compression groove, thereby adding an extra time consuming operation. The method and replacement assembly of my invention eliminates the need for this reaming operation.

Referring to the drawing, the reference numeral 1 indicates a cylinder of an internal combustion engine, the wall of which through wear has become outwardly tapered as at 2 so as to result in an annular overhanging shoulder or ridge 3 at the limit of travel of the compression ring of the piston 4. I have exaggerated this taper and overhang for the purpose of illustration but in many engines it becomes substantial.

With reference to the piston, I illustrate merely the upper compression ring groove 5 and the intermediate scraper ring groove 6 thereof, it being understood that pistons are also ordinarily provided with one or more grooves beneath the top two, including an oil ring groove which, for the purposes of the present invention, it is unnecessary to illustrate or describe. A conventional split annular "scraper" ring 7 is installed in groove 6.

Prior to describing in detail the structural features of the improved replacement assembly of the present invention, it is desirable to refer to the regrooving operation wherein the same is employed and for this purpose reference will be had to Figs. 1, 2, 3 and 4.

In Fig. 2, the reference numeral 8 designates a worn compression ring groove of the piston 4 prior to the regrooving steps or operation thereon. A worn compression ring 9 is indicated by dotted lines in this figure. It will be observed that the ring is shown as worn considerably in its cylinder contacting surface 10. I have not attempted to illustrate the side wear on the ring. Both top and bottom walls of the compression ring groove are considerably worn in use and particularly at the outer portions thereof, this worn condition being shown at 11 and 12, and the lower side is commonly worn more than the upper side. The compression ring groove and the compression ring are subject to much greater wear than other rings and grooves of the piston. This is due to various factors—among them being the explosive impacts, greater heat, less lubrication, and greater expansive action of carbon in the zones in which these compression rings operate. Of course, the compression rings are designed to and do, to a large extent, serve to protect the other rings of the piston.

In the practice of the method of my invention, the worn compression ring is removed and the groove 8 regrooved or widened to eliminate the rounded corners and the regrooves that may be worn in the side walls. I have not attempted to illustrate such worn areas as they vary greatly in different pistons. In any event, a sufficient quantity of metal indicated at 121 is removed in this regrooving operation to square or true up the groove so that it has flat parallel side walls. The amount of metal removed is sufficient to accommodate the new piston ring 14 which is preferably of the same dimensions as the ring that was removed was originally, and to receive the member 15 which when installed constitutes the upper wall of the groove so far as the ring 14 is concerned. The machining operation may be performed on a suitable lathe or a special machine may be provided for the purpose—that is, one specially designed for convenient regrooving.

After the worn groove has been regrooved, it is ready to receive the compression ring assembly of my invention. This is generally designated 13 and is installed in the enlarged or regrooved groove designated 5. This assembly comprise the split cast iron expansible compression ring member 14 and the member 15. I have not attempted to illustrate in Fig. 1 the clearance for the compression ring 14 but it will be understood that with the member 15 installed there is sufficient clearance for the ring 14. The ring element 15 is of substantially less radial width than the ring 14 and is in itself not a compression member. In practice, the compression ring 14 may be first installed in the regrooved compression ring groove and the member 15 is then installed.

The member 15 is a flat split member of substantially rectangular section, being cylindrical on both its inner and outer peripheries and contractible in nature or being of such internal dimension that when sprung into the groove above the compression member 14, it hugs the bottom of the groove. It is of such radial width that its outer edge lies within the groove or at least does not project therefrom to such an extent as to engage the cylinder wall. The axial thickness corresponds to approximately the amount of metal removed from the upper and lower walls of the piston ring groove during the machining operations, such metal being indicated at 121.

With the parts in the position illustrated, the element 15 constitutes, as stated, in effect the upper wall of he groove in which the piston ring acts. It prevents the new piston ring or assembly from coming into contact with the shoulder 3 at the upper end of the worn zone of the cylinder. Being truly cylindrical on its outer periphery, there is no fluid force arising from the compression in the cylinder tending to urge element 15 in one axial direction or the other and as a result create binding action on ring 14 and, inasmuch as the element fills up the axial space above compression ring 14, it seals the space internally of the compression ring from gas pressure.

I prefer to fabricate the spacer element of steel, and experience has shown that it is highly advantageous to make the same of a mild, relatively soft grade of steel for the reason that if steel of a substantial hardness is employed, for example comparable to that employed in certain installations wherein thin steel cylinder wall engaging elements are involved, as in the oil ring assembly of my Patent No. 2,148,997, of February 28, 1939, there is a tendency for the same to harden in use in the compression groove under certain circumstances and break. This may be due to the fact that, due to the high temperature encountered in the engine cylinder at the top of the piston and in the vicinity of the compression ring, the sudden quenching, in effect, of the highly heated metal by a contact therewith of a slug of raw gas on abrupt acceleration probably exerts a hardening action tending to reduce the life of such an initially hard element. In any event, I have determined that it is definitely advantageous to employ a mild grade of steel for the element 15. Alternatively element 15 might be made of brass or other non-brittle alloy.

The method and replacement assembly described above have the definite and very practical advantages that they enable a standard size replacement ring to be employed, thereby eliminating the disadvantage of requiring relatively infrequently demanded oversize rings to be manufactured and stocked in quantity; they enable a relatively high unit pressure or cylinder wall tension to be maintained, or even higher pressure to be attained by use of a replacement ring 14 of less axial width than the discarded ring, thereby conforming to the latest developments in piston ring design wherein reduction of axial dimension even to as little as $\frac{1}{16}$ of an inch has been recommended in some cases; and they eliminate any danger of the compression rings striking the overhanging shoulder 3 in operation, in turn obviating the necessity of removing said shoulder by preliminary machining or grinding, as has been the common practice. As distinguished from the above, the usual common replacement practice of employing an enlarged compression ring to fit the enlarged groove is disadvantageous in each and every one of the foregoing particulars.

I have illustrated and described my invention in an embodiment which I have found highly satisfactory. I have not attempted to illustrate or describe the various modifications and adaptations which I contemplate as it is believed that this disclosure will enable those skilled in the art to embody or adapt my invention as may be desired.

Having thus described my invention, what I claim as new and desire to secure by Letters Patent, is:

1. A regroove or replacement piston ring assembly for a piston compression ring groove which has been enlarged from its original axial width to a width substantially in excess thereof by elimination of worn rounded edges thereof and restoration of the side walls of the groove to parallel flat condition, thus bringing its upper wall above the shoulder at the top of the worn surface of the cylinder when the piston is at top dead center, said assembly comprising a main split cast iron expansible cylinder wall engaging replacement ring adapted to be disposed in the groove on the lower side thereof, being of a size equal approximately in axial thickness to the original groove, and a complemental thin flat spacer element of a relatively soft steel disposed above said ring, said element being of axial thickness equal approximately to that of the stock removed from the walls of the groove in restoring the same, thereby constituting a new top groove wall for the replacement ring spacing the same from the restored top groove wall, said element being contractile in nature to engage the bottom of the groove and being of a radial width to lie wholly within the outer periphery of the groove, the relative axial dimensions of the replacement ring and the spacer element being such that at the limit of the upward stroke of the piston, the top surface of the ring is below the shoulder at the upper end of the worn zone of the cylinder, caused by wear of previously replaced rings.

2. A method of correcting worn piston compression ring grooves having rounded worn edges comprising machining the top and bottom of the groove to substantially enlarge its axial width over the original axial width by removing the round worn edges thereof and restoring the side walls of the groove to flat parallel condition, thus bringing its upper wall above the shoulder at the top of the worn surface of the cylinder when the piston is at top dead center, placing a cast iron replacement ring in said groove, the axial thickness of which ring equals approximately to and is no greater than the original axial width of the groove, and disposing on top of said ring in said enlarged groove an annular split complemental spacer element of axial thickness equal to that of the stock removed from the walls of the groove in restoring the same, thereby constituting a new top groove wall for the replacement ring spacing the same from the restored top groove wall, said element being of substantially less radial thickness than the main ring and lying within the outer periphery of the groove when installed, the relative axial dimensions of the replacement ring and the spacer element being such that at the limit of the upward stroke of the piston, the top surface of the ring is below the shoulder at the upper end of the worn zone of the cylinder, caused by wear of previously replaced rings.

3. A regroove or replacement ring assembly for a piston compression ring groove which has been enlarged from its original axial width to a width substantially in excess thereof by elimination of worn rounded edges thereof and restoration of side walls of the groove to substantially parallel flat condition, thus bringing its upper wall above the shoulder at the top of the worn surface of the cylinder when the piston is at top dead center, said assembly comprising a main split expansible cylinder wall engaging replacement ring to be disposed in the groove on the lower side thereof, and a thin complemental spacer element disposed above said ring and of axial thickness equal approximately to that of the distance between the top of the ring and the top of the groove, thereby constituting a new top groove wall for the replacement ring spacing the same from the restored top groove wall, said spacer element being wholly within the outer periphery of the groove, the relative axial thickness of the ring and spacer element being such that at the limit of the upward stroke of the piston, the upper surface of the ring is beneath the shoulder at the upper end of the worn zone of the cylinder, caused by wear of previously replaced rings.

4. A method of correcting worn piston compression ring grooves, comprising machining the top and bottom of the worn groove to substantially enlarge its axial width, thus bringing its upper wall above the shoulder at the top of the worn surface of the cylinder when the piston is at top dead center, placing a replacement compression ring on the bottom wall of said groove, and disposing on the top of said ring in said enlarged groove an annular split spacer element of axial thickness substantially equal to the distance between the top of said ring and the top of said groove, said spacer element being wholly within the outer periphery of the groove, the relative axial thickness of said ring and spacer element being such that at the limit of the upward stroke of the piston, the upper surface of the ring is beneath the shoulder at the upper end of the worn zone of the cylinder, caused by wear of the previously replaced rings.

HAROLD P. PHILLIPS.